(12) United States Patent
Greene

(10) Patent No.: US 9,269,385 B1
(45) Date of Patent: Feb. 23, 2016

(54) SERVO CHANNEL HYBRID ANALOG-DIGITAL HIGH PASS FILTER

(71) Applicant: Avago Technologies General IP (Singapore) Pte. Ltd., Singapore (SG)

(72) Inventor: Robert A. Greene, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/512,376

(22) Filed: Oct. 10, 2014

(51) Int. Cl.
*G11B 5/00* (2006.01)
*G11B 5/596* (2006.01)
*G11B 20/10* (2006.01)

(52) U.S. Cl.
CPC ...... *G11B 5/59622* (2013.01); *G11B 20/10037* (2013.01)

(58) Field of Classification Search
CPC .............. G11B 20/0007; G11B 20/10527; G11B 20/1403; G11B 30/10009; G11B 20/06; G11B 2220/90; H04M 11/062; H04M 3/007; H04M 5/92
USPC ............... 360/8, 25, 32, 39, 40, 43, 46, 51; 379/402, 403
See application file for complete search history.

(56) References Cited

U.S. PATENT DOCUMENTS

| 4,754,483 A * | 6/1988 | Weaver ............. H03H 17/0264 360/51 |
| 7,009,792 B2 | 3/2006 | Sakai et al. |
| 8,441,753 B2 | 5/2013 | Cao |
| 2002/0089773 A1 | 7/2002 | Shimomura et al. |

* cited by examiner

*Primary Examiner* — Nabil Hindi

(57) ABSTRACT

An apparatus for storing data includes a storage medium, a head assembly disposed in relation to the storage medium and operable to read and write data on the storage medium, an analog high pass filter operable to filter an output from the head assembly to yield a filtered analog signal, wherein a high pass corner frequency of the analog high pass filter is below a servo data frequency in the data, an analog to digital converter operable to sample the filtered analog signal to yield digital samples, and a digital filter operable to perform pole-zero compensation for the analog high pass filter on the digital samples to yield filtered digital samples, with a zero at the high pass corner frequency of the analog high pass filter, and with a pole at a frequency higher than the high pass corner frequency of the analog high pass filter.

20 Claims, 4 Drawing Sheets

SERVO CHANNEL HYBRID ANALOG-DIGITAL HIGH PASS FILTER

FIELD OF THE INVENTION

Various embodiments of the present invention provide systems and methods for a hybrid analog/digital high pass filter, and in particular for a servo channel hybrid analog/digital high pass filter that differentiates a perpendicular magnetic recording signal so that it can be processed as a longitudinal magnetic recording signal.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. Data can be written using perpendicular magnetic recording, in which data bits are aligned vertically, perpendicular to the disk, or using longitudinal magnetic recording, in which data bits are aligned horizontally in relation to the drive's spinning platter, parallel to the disk. While perpendicular magnetic recording can achieve a greater storage density than longitudinal magnetic recording, read channels have conventionally been designed to process longitudinal magnetic recording signals. A perpendicular magnetic recording signal can be converted by a signal processing differentiation so that it can be processed as if it were a longitudinal magnetic recording signal. However, such processing can limit the data rate and reduce signal amplitude, making the channel sensitive to environmental variation.

SUMMARY

Various embodiments of the present invention provide systems and methods for a hybrid analog/digital high pass filter, and in particular for a servo channel hybrid analog/digital high pass filter that differentiates a perpendicular magnetic recording signal so that it can be processed as a longitudinal magnetic recording signal.

In some embodiments, an apparatus for storing data includes a storage medium, a head assembly disposed in relation to the storage medium and operable to read and write data on the storage medium, an analog high pass filter operable to filter an output from the head assembly to yield a filtered analog signal, wherein a high pass corner frequency of the analog high pass filter is below a servo data frequency in the data, an analog to digital converter operable to sample the filtered analog signal to yield digital samples, and a digital filter operable to perform pole-zero compensation for the analog high pass filter on the digital samples to yield filtered digital samples, with a zero at the high pass corner frequency of the analog high pass filter, and with a pole at a frequency higher than the high pass corner frequency of the analog high pass filter.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

A hybrid analog/digital high pass filter is disclosed herein in which the low-frequency corner of an analog portion of the hybrid filter is set at a lower frequency than the desired overall low-frequency corner of the hybrid filter, increasing the bandwidth and reducing the sensitivity of the hybrid filter, and in which pole-zero compensation in a downstream digital portion of the hybrid filter sets the low-frequency corner of the hybrid filter at the desired point. In some embodiments, a pole in the digital portion of the hybrid analog/digital high pass filter is set at the desired overall low-frequency corner frequency differentiating frequency and a zero in the digital portion of the hybrid analog/digital high pass filter is set at or about the lower frequency of the low-frequency corner of the high pass filter.

The hybrid analog/digital high pass filter can be used in any of a number of applications, such as, but not limited to, in a read channel circuit for processing signals read from servo fields in a perpendicular magnetic recording storage medium. The hybrid analog/digital high pass filter in such applications differentiates the perpendicular magnetic recording signal so that it can be processed as a longitudinal magnetic recording signal. In some cases, a perpendicular magnetic recording signal includes a DC level, appearing as a square wave, whereas information in a longitudinal magnetic recording signal is carried by transitions between magnets or magnetically-represented states. The hybrid analog/digital high pass filter effectively differentiates the perpendicular magnetic recording signal, transforming it so that it can be processed in a read channel as if it were a longitudinal magnetic recording signal.

In some embodiments, phase error is sensed and the sampling phase of an analog to digital converter is adjusted in response. In some embodiments, phase error is sensed and the pole-zero compensation in the digital portion of the hybrid filter is adjusted to more perfectly cancel any low-frequency corner of the analog high pass portion of the hybrid filter. Such phase error sensing can be performed, for example, using the output of a servo burst demodulation circuit.

Figure 1:
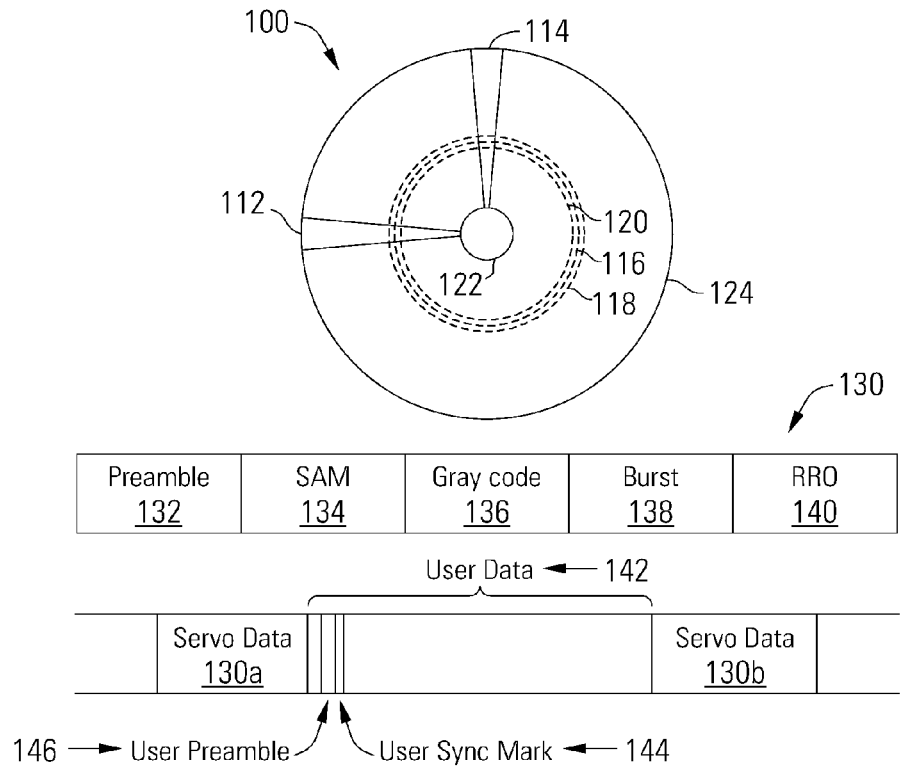
FIG. 1 is a diagram of a magnetic storage medium and sector data scheme that may be used with a servo channel hybrid analog/digital high pass filter in accordance with some embodiments of the present invention.

Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114 using perpendicular magnetic recording in some embodiments. Such servo data can be processed by a servo channel including a hybrid analog/digital high pass filter. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information or syncmarks, identifying the location of user data fragments within the user data region 142. A number of user data fragments combine to form a data sector.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user syncmark 144 and a user preamble 146.

Figure 2:
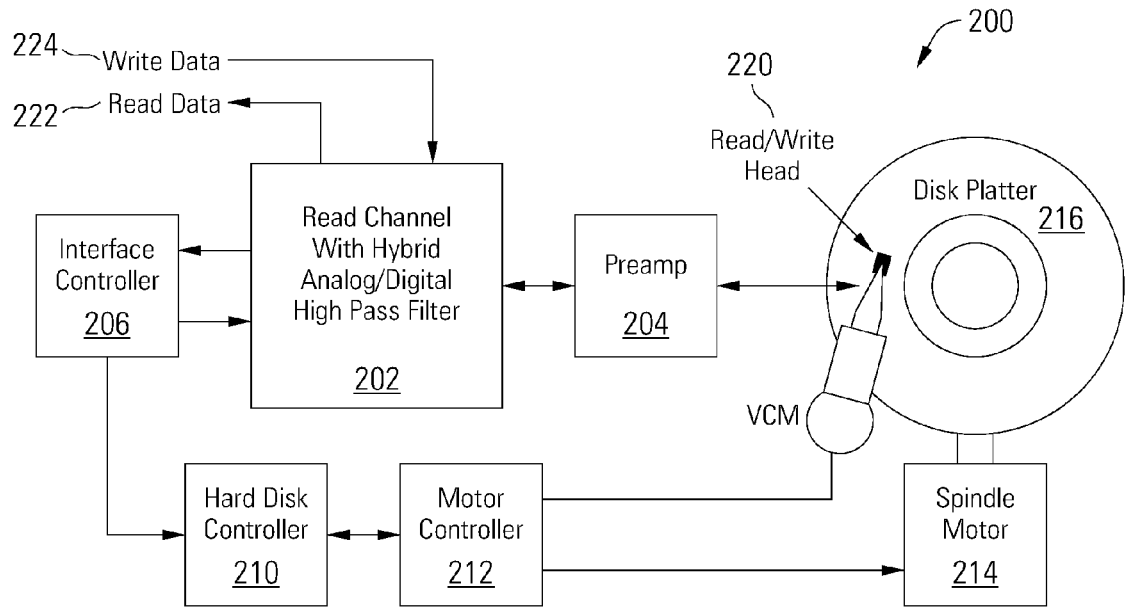
FIG. 2 depicts a storage system including a read channel with a servo channel hybrid analog/digital high pass filter in accordance with some embodiments of the present invention.

Turning to FIG. 2, a storage system 200 is disclosed which includes a read channel circuit 202 incorporating a servo channel with a hybrid analog/digital high pass filter in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216.

The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. Servo data is processed by the read channel circuit 202, including differentiating the signal representing servo data in a hybrid analog/digital high pass filter.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
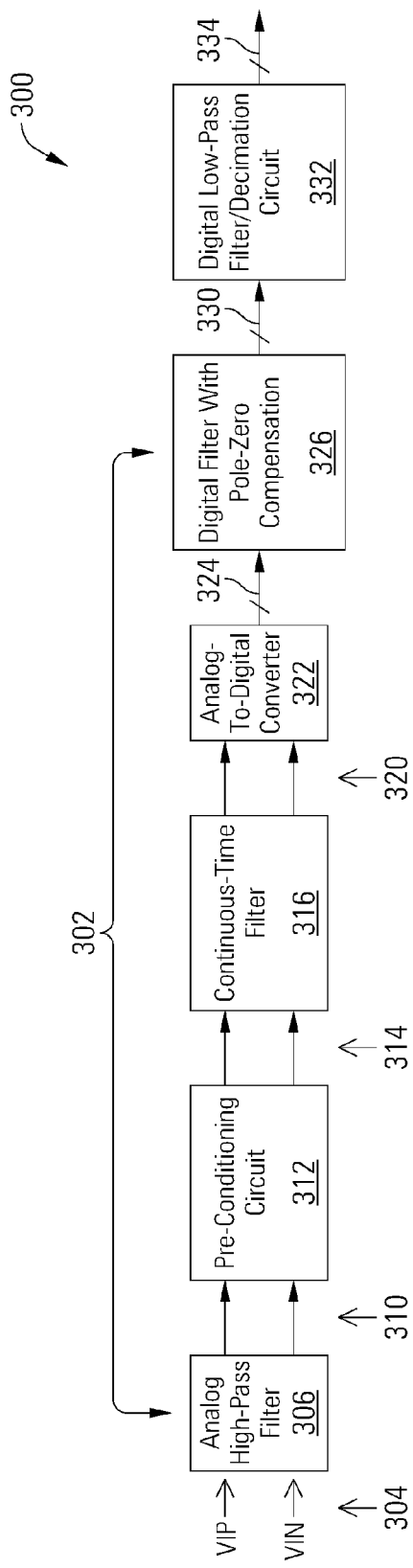
FIG. 3 depicts a servo signal path with a hybrid analog/digital high pass filter in which a dedicated digital low pass filter for pole-zero compensation is included in accordance with some embodiments of the present invention.

Turning to FIG. 3, a servo signal path 300 with a hybrid analog/digital high pass filter 302 is depicted in accordance with some embodiments of the present invention. In some embodiments as in FIG. 3, the hybrid analog/digital high pass filter 302 applies pole-zero compensation in a dedicated digital filter 326. Various corner frequency and pole-zero frequencies are referred to herein, relative to a servo data rate or 1× "baud" rate. In some embodiments, servo data is encoded with wide-biphase encoding in which a logical '1' is represented by physical samples 0-0-1-1 and a logical '0' is represented by physical samples 1-1-0-0. The term "full-rate" is used herein to refer to the encoded rate which uses 4 samples for one bit. In other words, the full-rate signal is one-fourth (25%) of the 1× baud rate or servo data rate, and is the approximate frequency at which the differentiating pole is placed in the digital portion of the hybrid analog/digital high pass filter 302.

An analog input 304 is received from a storage device. In some embodiments, the analog input 304 is received from a preamplifier (e.g., 204) as a differential signal. The signal on analog input 304 is filtered in an analog high-pass filter 306 or AC coupling circuit, forming the analog portion of the hybrid analog/digital high pass filter 302. The low-frequency corner of the analog high-pass filter 306 is set at a lower frequency than desired for the overall hybrid analog/digital high pass filter 302, and is then compensated for or corrected in a digital filter with pole-zero compensation 326. The frequency at which the low-frequency corner of the analog high-pass filter 306 is set is not limited to any particular value or purpose. The analog high-pass filter 306 can use any suitable circuit or device for filtering analog data with the desired high-pass transfer function. Based upon the disclosure provided herein, one of ordinary skill in the art will recognize a variety of analog high-pass filters that can be used in relation to different embodiments of the present invention.

The analog signal 310 from the analog high-pass filter 306 is provided to a pre-conditioning circuit 312 in some embodiments, which can include, but is not limited to, a variable gain amplifier to correct amplitude errors, baseline wander digital to analog converter to correct baseline bias errors, and magneto-resistive (MR) asymmetry correction. The analog signal 314 from the pre-conditioning circuit 312 is provided to a continuous-time low-pass filter 316 in some embodiments which removes signal content above that desired in the servo signal using a high-frequency corner above the signal band of interest. The pre-conditioning circuit 312 and continuous-time filter 316 can include any suitable circuits for conditioning and filtering analog signals. Based upon the disclosure provided herein, one of ordinary skill in the art will recognize a variety of circuits that can be used for pre-conditioning and filtering in relation to different embodiments of the present invention.

The analog signal 320 from the continuous-time filter 316 is provided to an analog to digital converter 322 which samples the analog signal 320 to yield digital samples 324. In some embodiments, the analog to digital converter 322 oversamples the analog signal 320 at any desired oversampling rate, such as, but not limited to, twice the baud rate, yielding two samples per channel bit interval. Based upon the disclosure provided herein, one of ordinary skill in the art will recognize a variety of analog to digital converter circuits that may be used in relation to different embodiments of the present invention.

Digital samples 324 from the analog to digital converter 322 are provided to the digital filter with pole-zero compensation 326. The digital filter with pole-zero compensation 326 can be implemented using any suitable digital filter circuit. In some embodiments, the digital filter with pole-zero compensation 326 comprises a digital finite impulse response filter (DFIR) with tap coefficients set at values applying the desired frequency response, placing a pole at or about the desired low-frequency corner of the hybrid analog/digital high pass filter 302 and a zero at or about the low-frequency corner of the analog high-pass filter 306. Based upon the disclosure provided herein, one of ordinary skill in the art will recognize a variety of digital filter circuits that may be used in relation to different embodiments of the present invention as part of the hybrid analog/digital high pass filter 302.

The frequency response of the analog high-pass filter 306 can be represented in the Laplace domain by:

$$H(s) = \frac{s/\omega_r}{s/\omega_r + 1} \quad \text{(Eq 1)}$$

Assuming that the desired high-pass filtering to be achieved by the hybrid analog/digital high pass filter 302 is 25% of the servo data rate yields:

$$H(s) = \frac{4s}{4s+1} \quad \text{(Eq 2)}$$

A filter G (s) that satisfied Equation 2 can be identified as follows:

$$G(s) \cdot \frac{4s}{4s+1} = \frac{20s}{20s+1} \quad \text{(Eq 3)}$$

Rearranging Equation 3 yields the desired filter:

$$G(s) = \frac{4s+1}{4s} \cdot \frac{20s}{20s+1} = \frac{4s+0.2}{4s+1} \quad \text{(Eq 4)}$$

Signal and, more importantly, noise will be attenuated below the pole frequency in this filter, in this case 25% of the servo data rate. There are a variety of techniques, such as, but not limited to, bilinear transform, impulse invariance, and window design methods to synthesize this analog filter as a digital finite impulse response filter. Because the filtering is moved from the beginning of the signal path in the analog high-pass filter 306 to the end in the digital filter with pole-zero compensation 326, noise for all of the circuits between the analog high-pass filter 306 output and the digital filter with pole-zero compensation 326 is suppressed.

Other processing can be performed as well in the servo signal path 300 as desired. In some embodiments, a digital low-pass filter/decimation circuit 332 performs additional filtering and decimation of the filtered digital samples 330 from the digital filter with pole-zero compensation 326 to compensate for the 2× oversampling performed in analog to digital converter 322, yielding decimated digital samples 334. Additional processing can be performed as desired, for example searching for servo address marks, decoding Gray codes, performing burst demodulation, processing repeatable run-out fields, etc. Furthermore, the digital filter with pole-zero compensation 326 can be placed at any suitable location in the servo signal path 300 after the analog to digital converter 322, for example reversing the order of the digital filter with pole-zero compensation 326 and digital low-pass filter/ decimation circuit 332.

Again, the hybrid analog/digital high pass filter 302 can be used for any suitable purpose. In some embodiments, the hybrid analog/digital high pass filter 302 is used to differentiate a perpendicular magnetic recording servo signal, transforming it so that it can be processed in a read channel as if it were a longitudinal magnetic recording signal. In some such embodiments, the signal content is substantially contained between about 6.25% (quarter-rate) and 25% (full-rate) of the servo data rate. If the low-frequency corner of the overall hybrid analog/digital high pass filter 302 should be set at 25% of the servo data rate to perform the desired differentiation, the low-frequency corner of the analog high-pass filter 306 is set lower based on the lower based on the signal content, such as, but not limited to, about 5% to be below the expected quarter-rate signal content at 6.25% of the servo data rate. This lower value for the low-frequency corner of the analog high-pass filter 306 is high enough that it still allows the channel to reject undesirable low-frequency signal perturbations (such as thermal asperities and rapid baseline shifts) while significantly improving the signal-to-noise ratio at the input to the analog to digital converter 322. The reduced low-frequency corner of the analog high-pass filter 306 is then corrected by pole-zero compensation in the digital filter with pole-zero compensation 326, placing a pole in the digital filter with pole-zero compensation 326 at the differentiating frequency of about 25% (full-rate) of the servo data rate and placing the zero in the digital filter with pole-zero compensation 326 at the lower frequency of the low-frequency corner of the high pass filter, or about 5% of the servo data rate in this case. (Notably, the digital filter with pole-zero compensation 326 can contain other poles and zeros as desired.)

It is noteworthy that the low-frequency signal content present at the input to the analog to digital converter 322 is much larger with the hybrid analog/digital high pass filter 302 than with a conventional analog high pass filter with a higher frequency for the low-frequency corner, while the signal content at the output of the digital filter with pole-zero compensation 326 is nearly identical over the band of interest. This results in better signal to noise ratio at the input to the analog to digital converter 322 since the signal is barely suppressed by the analog high-pass filter 306. The magnitude response of the overall 2× oversampled servo signal path 300 with the hybrid analog/digital high pass filter 302 can be substantially equal to that of a servo signal path with a conventional analog high pass filter with a higher frequency for the low-frequency corner. The phase response of the overall 2× oversampled servo signal path 300 with the hybrid analog/digital high pass filter 302 also substantially matches that of a servo signal path with a conventional analog high pass filter with a higher frequency for the low-frequency corner over the primary band of interest.

Figure 4:
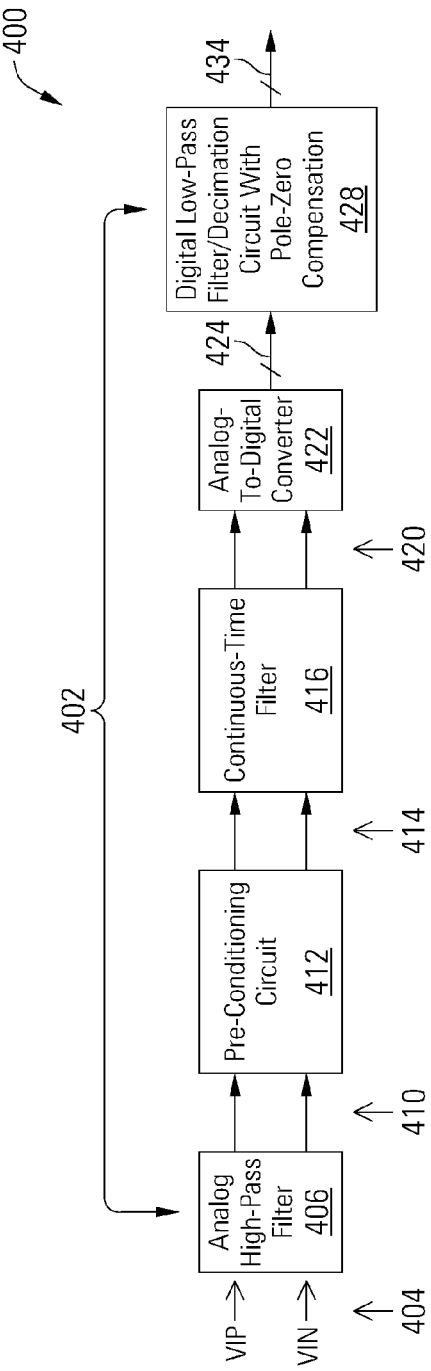
FIG. 4 depicts a servo signal path with a hybrid analog/digital high pass filter in which digital pole-zero compensation is included in a dual-purpose digital low pass filter in accordance with some embodiments of the present invention.

Turning to FIG. 4, a servo signal path 400 is depicted with a hybrid analog/digital high pass filter 402 in which digital pole-zero compensation is included in a dual-purpose digital low pass filter and decimation circuit with pole-zero compensation 428 in accordance with some embodiments of the present invention. An analog input 404 is filtered in an analog high-pass filter 406 or AC coupling circuit, forming the analog portion of the hybrid analog/digital high pass filter 402. The low-frequency corner of the analog high-pass filter 406 is set at a lower frequency than desired for the overall hybrid analog/digital high pass filter 402, and is then compensated for or corrected in a digital low-pass filter with pole-zero compensation 426.

The analog signal 410 from the analog high-pass filter 406 is provided to a pre-conditioning circuit 412 in some embodiments, which can include, but is not limited to, a variable gain amplifier to correct amplitude errors, baseline wander digital to analog converter to correct baseline bias errors, and magneto-resistive (MR) asymmetry correction. The analog signal 414 from the pre-conditioning circuit 412 is provided to a continuous-time low-pass filter 416 in some embodiments which removes signal content above that desired in the servo signal using a high-frequency corner above the signal band of interest.

The analog signal 420 from the continuous-time filter 416 is provided to an analog to digital converter 422 which samples the analog signal 420 to yield digital samples 424. In some embodiments, the analog to digital converter 422 performs 2× oversampling of the analog signal 420.

Digital samples 424 from the analog to digital converter 422 are provided to the digital low pass filter and decimation circuit with pole-zero compensation 428, which has a pole at the desired low-frequency corner of the hybrid analog/digital high pass filter 402 and a zero at the low-frequency corner of the analog high-pass filter 406, and which also performs additional filtering and decimation of the filtered digital samples 430 from the digital low-pass filter with pole-zero compensation 426 to compensate for the 2× oversampling performed in analog to digital converter 422, yielding decimated digital samples 434.

The digital pole-zero compensation can thus be implemented as part of an existing digital filter block as in FIG. 4, as well as in a separate filter block as in FIG. 3. If the digital pole-zero compensation is incorporated into an existing filter as in FIG. 4, the filter can be modified by convolving the existing filter impulse response with the impulse response of the pole-zero pair. This convolution can be done on the fly or the convolved impulse response can be stored in a lookup table to configure the digital low pass filter 428. If the pole-zero compensation is performed in a separate filter block as in the digital filter with pole-zero compensation 326 of FIG. 3, it can be easier to tune the pole-zero compensation to match with the analog high-pass filter 406.

The hybrid analog/digital high pass filter 306, 406 increases the order of the system by the pole and the zero in the digital filter with pole-zero compensation 326, 428 unless the pole-zero compensation is matched with the analog high-pass filter 306, 406. The higher order phase response of an imperfectly canceled analog high pass filter pole can cause a phase error that is cancelled in some embodiments by sensing the phase error based on burst demodulation of the burst servo field (e.g., 138).

Figure 5:
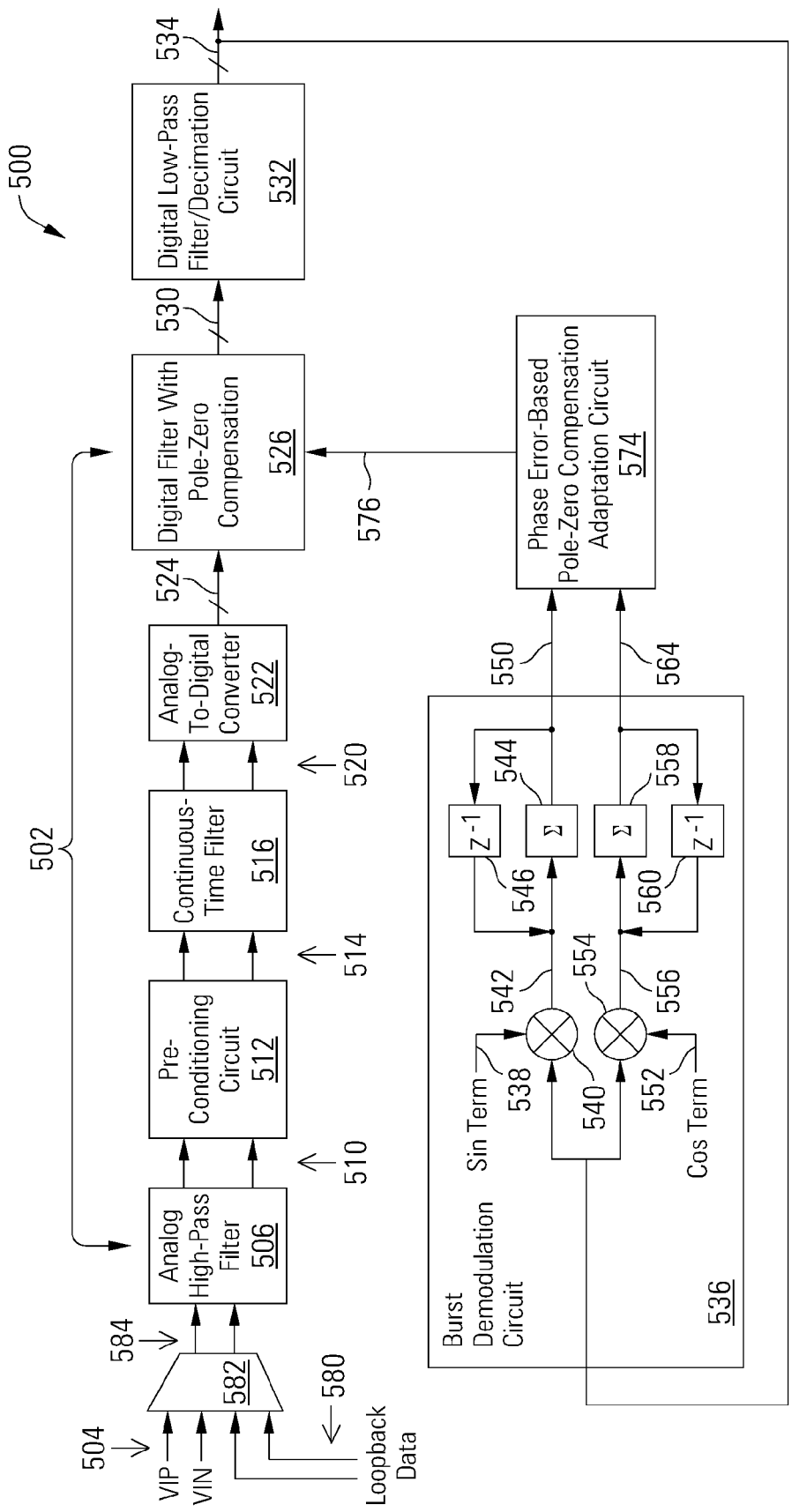
FIG. 5 depicts a servo signal path with a hybrid analog/digital high pass filter and pole-zero compensation correction in accordance with some embodiments of the present invention.

Turning to FIG. 5, a servo signal path 500 with a hybrid analog/digital high pass filter 502 and pole-zero compensation correction is depicted in accordance with some embodiments of the present invention. In this embodiment, the tap coefficients of the digital filter with pole-zero compensation 526 can be adapted during a calibration process, for example when the servo system is not track-following (e.g. during power up calibration or during a seek), or on the fly during normal servo events.

A multiplexer 582 selects either the analog input 504 or loopback data 580 as input 584 to the AC coupling analog high-pass filter 506. The analog high-pass filter 506 filters the selected analog input 584, forming the analog portion of the hybrid analog/digital high pass filter 502. The low-frequency corner of the analog high-pass filter 506 is set at a lower frequency than desired for the overall hybrid analog/digital high pass filter 502, and is then compensated for or corrected in a dual-purpose digital low-pass filter and decimation circuit with pole-zero compensation 528.

The analog signal 510 from the analog high-pass filter 506 is provided to a pre-conditioning circuit 512 in some embodiments, which can include, but is not limited to, a variable gain amplifier to correct amplitude errors, baseline wander digital to analog converter to correct baseline bias errors, and magneto-resistive (MR) asymmetry correction. The analog signal 514 from the pre-conditioning circuit 512 is provided to a continuous-time low-pass filter 516 in some embodiments which removes signal content above that desired in the servo signal using a high-frequency corner above the signal band of interest.

The analog signal 520 from the continuous-time filter 516 is provided to an analog to digital converter 522 which performs 2× oversampling of the analog signal 520 to yield digital samples 524, although the servo signal path 500 is not limited to oversampling or to any particular rate of oversampling.

Digital samples 524 from the analog to digital converter 522 are provided to the digital filter with pole-zero compensation 526. The digital filter with pole-zero compensation 526 can be implemented using any suitable digital filter circuit. In some embodiments, the digital filter with pole-zero compensation 526 comprises a digital finite impulse response filter (DFIR) with tap coefficients set at values applying the desired frequency response, placing a pole at or about the desired low-frequency corner of the hybrid analog/digital high pass filter 502 and a zero at or about the low-frequency corner of the analog high-pass filter 506.

A digital low-pass filter/decimation circuit 532 performs additional filtering and decimation of the filtered digital samples 530 from the digital filter with pole-zero compensation 526 to compensate for the 2× oversampling performed in analog to digital converter 522, yielding decimated digital samples 534.

A burst demodulation circuit 536 processes the burst data in digital samples 534 corresponding to the burst servo field (e.g., 138), yielding a sine component 550 and a cosine component 564 of the burst demodulation result. The phase error can be sensed by observing the burst demodulation result. In a perfectly aligned channel, the sine component 550 of the demodulation result will be large while the cosine component 564 should be nearly zero (with noise). Again, this correction can be done based on the loopback data 580 or with the analog input 504 containing the servo readback signal from the heads and media. If the cosine component 564 is significantly positive, then the analog high-pass filter 506 has a positive error. Conversely, if the cosine component 564 is significantly negative, then the analog high-pass filter 506 has a negative error. The burst demodulation can be noisy, and, as such, is averaged in some embodiments to estimate the phase error of the digital low-pass filter 528. Furthermore, the servo system in magnetic hard drives can be sensitive to servo event-to-servo event shifts. In some embodiments, the correction applied to the digital pole-zero cancellation in digital low-pass filter 528 is small, or is applied when the servo system is not track-following (e.g. during power up calibration or during a seek).

In some embodiments, the burst demodulation circuit 536 essentially performs a Discrete Fourier Transform at the burst frequency ($\omega_0$) capturing both the real and imaginary components of the transform. A multiplier 540 multiplies the digital samples 534 by a sin term 538 ($\sin(\omega_0 \cdot k/2\pi n)$), yielding output 542. A multiplier 554 multiplies the digital samples 534 by a cos term 552 ($\cos(\omega_0 \cdot k/2\pi n)$), yielding output 556. Accumulators 544, 558 and delay elements 546, 560 yield gradually adapting versions of the sine component 550 and cosine component 564 of the burst demodulation result. The value of k is incremented each clock cycle from 0 to n−1 on the nth clock cycle when it returns to 0. In some embodiments, the burst frequency is ⅛th of the servo clock rate. This means that the sin term 538 and the cos term 552 each cycle through the same set of 8 values every 8 clock cycles. In such cases, the sin terms 538 are fixed point approximations of the sine of angles 0, 45, 90, 135, 180, 225, 270, and 315 degrees: 0, sqrt(0.5), 1, sqrt(0.5), 0, −sqrt(0.5), −1, −sqrt(0.5) then returning back to 0 again. The cos terms 552 for the same set of samples are fixed point approximations of the cosine of angles 0, 45, 90, 135, 180, 225, 270, and 315 degrees: 1, sqrt(0.5), 0, −sqrt(0.5), −1, −sqrt(0.5), 0, sqrt(0.5) then returning back to 1 again.

Depending on the phase of the digital samples 534 from the digital low-pass filter 528, the sine component 550 and a cosine component 564 will vary from all sin (positive or negative) to all cos (positive or negative) or some mix of the two. For example, if the sine component 550 were a positive number and the cosine component 564 were zero, the phase of the digital samples 534 could arbitrarily be interpreted as being zero degrees. Then, if the cosine component 564 were a positive number and the sine component 550 were zero, the phase of the digital samples 534 would be interpreted as 90 degrees. If the sine component 550 and cosine component 564 were both positive and equal, the phase of the digital samples 534 would be interpreted as 45 degrees. With the signs of the sine component 550 and cosine component 564, the quadrant can be determined as follows:

+ve SIN, +ve COS: quadrant I (0-90 degrees)
+ve SIN, −ve COS: quadrant II (90-180 degrees)
−ve SIN, −ve COS: quadrant III (180-270 degrees)
−ve SIN, +ve COS: quadrant IV (270-360 degrees)

By calculating the arc tangent of the sin/cos ratio, the phase within the quadrant can be determined. In some embodiments, the expected phase is zero, and the actual phase can be measured in a phase error-based pole-zero compensation adaptation circuit 574, which adjusts the tap coefficients 576 for the digital filter with pole-zero compensation 526 in any suitable manner, tuning the pole-zero compensation to match with the analog high-pass filter 506, based on the phase error and the impulse response of the desired compensation. The pole-zero compensation adaptation circuit 574 can calculate the tap coefficients 576 or can retrieve them from a lookup table.

Figure 6:
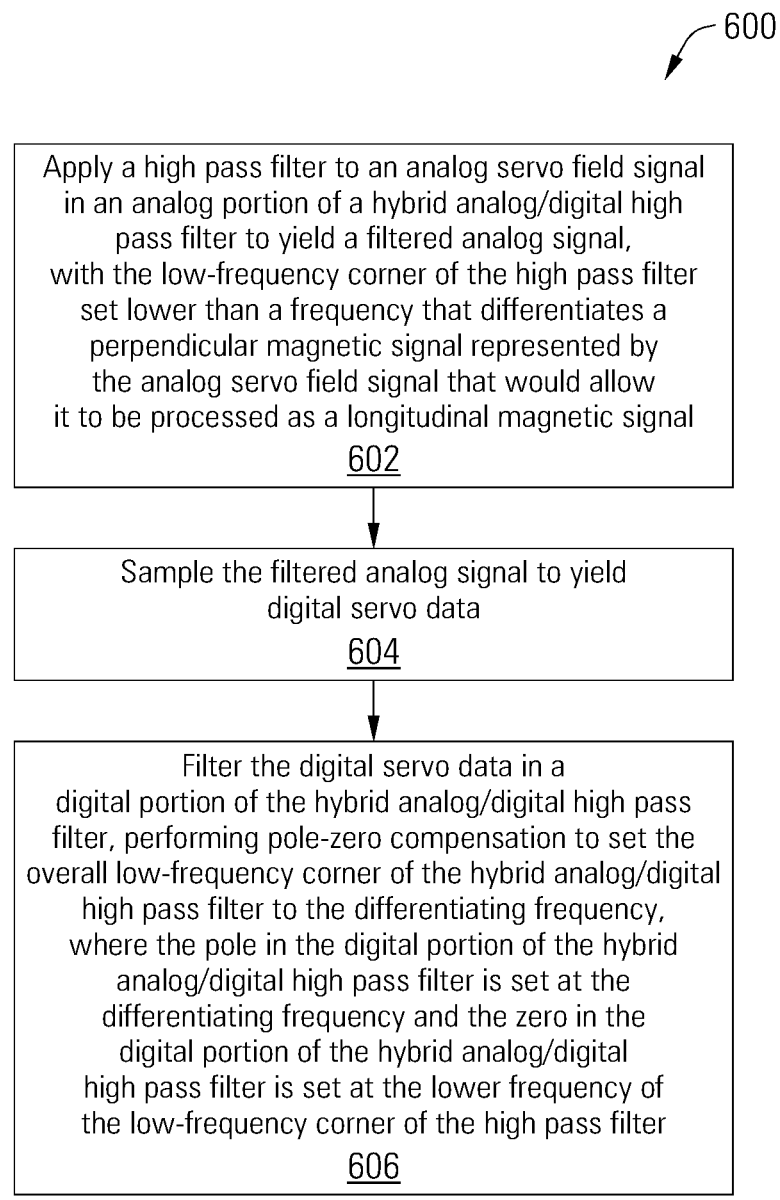
FIG. 6 is a flow diagram showing a method for servo channel differentiation in a hybrid analog/digital high pass filter to process perpendicular magnetic signal as a longitudinal magnetic signal in accordance with some embodiments of the present invention.

Turning to FIG. 6, a flow chart 600 illustrates a method for servo channel differentiation in a hybrid analog/digital high pass filter to process perpendicular magnetic signal as a longitudinal magnetic signal in accordance with some embodiments of the invention. Following flow chart 600, a high pass filter is applied to an analog servo field signal in an analog portion of a hybrid analog/digital high pass filter to yield a filtered analog signal. (Block 602) The low-frequency corner of the high pass filter is set lower than a frequency that differentiates a perpendicular magnetic signal so that it can be processed as a longitudinal magnetic signal. The filtered analog signal is sampled to yield digital servo data. (Block 604) The digital servo data is filtered in a digital portion of the hybrid analog/digital high pass filter. (Block 606) This performs pole-zero compensation to set the overall low-frequency corner of the hybrid analog/digital high pass filter to the differentiating frequency. The pole in the digital portion of the hybrid analog/digital high pass filter is set at or about the differentiating frequency and the zero in the digital portion of the hybrid analog/digital high pass filter is set at the lower frequency of the low-frequency corner of the high pass filter.

The hybrid analog/digital high pass filter disclosed herein includes an analog high-pass filter with digital frequency compensation, which can be implemented using a separate filter block in the signal path or which can be incorporated in an existing filter block. The hybrid analog/digital high pass filter can in some embodiments include coarse digital tuning of the compensation block to achieve better phase or magnitude matching in the presence of significant analog variation. The hybrid analog/digital high pass filter can in some embodiments include a method for automatically sensing variation in the analog high pass filter. The hybrid analog/digital high pass filter can in some embodiments include ongoing or periodic correction of the compensation. By applying digital pole-zero compensation after the analog to digital converter results in significant filtering of electronic noise in the servo signal path, for example including any variable gain amplifier, baseline wander digital to analog converter, MR asymmetry correction, and continuous time filter between the analog portion and digital portion of the hybrid analog/digital high pass filter. This can provide significant performance gains for servo burst demodulation and servo address mark/Gray code recovery.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides a novel hybrid analog/digital high pass filter. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for storing data, comprising:
    a storage medium;
    a head assembly disposed in relation to the storage medium and operable to read and write data on the storage medium;
    an analog high pass filter operable to filter an output from the head assembly to yield a filtered analog signal, wherein a high pass corner frequency of the analog high pass filter is below a servo data frequency in the data;
    an analog to digital converter operable to sample the filtered analog signal to yield digital samples; and
    a digital filter operable to perform pole-zero compensation for the analog high pass filter on the digital samples to yield filtered digital samples, with a zero at the high pass corner frequency of the analog high pass filter, and with a pole at a frequency higher than the high pass corner frequency of the analog high pass filter.

2. The apparatus of claim 1, wherein the pole of the digital filter is at about 25% of a servo data rate.

3. The apparatus of claim 1, wherein the zero of the digital filter and the high pass corner frequency of the analog high pass filter are at about 6.25% of a servo data rate.

4. The apparatus of claim 1, wherein the output from the head assembly represents a perpendicular magnetic signal, and wherein the pole of the digital filter is set at a frequency that applies a mathematical differentiation to the digital samples such that they can be processed as a longitudinal magnetic signal.

5. The apparatus of claim 1, wherein the analog to digital converter is operable to oversample the filtered analog signal.

6. The apparatus of claim 1, wherein the filtered analog signal is oversampled, and wherein a transfer function of the digital filter comprises a transfer function of the zero and the pole convolved with a low pass filtering transfer function to compensate for the oversampling.

7. The apparatus of claim 1, wherein the filtered analog signal is oversampled yielding oversampled digital samples, further comprising a decimation circuit and digital low pass filter operable to compensate for the oversampled digital samples.

8. The apparatus of claim 1, further comprising a servo burst demodulator circuit operable to calculate a phase error of the filtered digital samples.

9. The apparatus of claim 8, wherein the servo burst demodulator circuit is operable to calculate the phase error of the filtered digital samples when the filtered digital samples are derived from a loopback signal that is not written to the storage medium.

10. The apparatus of claim 8, further comprising a correction circuit operable to adjust the zero and the pole based on the phase error.

11. The apparatus of claim 8, wherein the servo burst demodulator circuit is further operable to average the filtered digital samples while calculating the phase error.

12. The apparatus of claim 8, wherein encoded servo data in the data on the storage medium is substantially contained within a primary servo data band of interest and a secondary servo data band of interest, wherein the primary servo data band of interest is between a half-rate and a full-rate of a servo data rate, and wherein the secondary servo data band of interest is between a quarter-rate and the half-rate of a servo data rate, wherein the pole of the digital filter is at the full-rate and wherein the zero of the digital filter and the high pass corner frequency of the analog high pass filter are at the quarter-rate.

13. A method for processing data, comprising:
    high pass filtering an analog servo field signal in an analog portion of a hybrid analog/digital high pass filter to yield a filtered analog signal;
    sampling the filtered analog signal in an analog to digital converter to yield digital servo data; and
    filtering the digital servo data in a digital portion of the hybrid analog/digital high pass filter to perform pole-zero compensation for the analog portion of the hybrid analog/digital high pass filter.

14. The method of claim 13, wherein a pole in the digital portion of the hybrid analog/digital high pass filter is set at an overall low-frequency corner, and wherein a zero in the digital portion of the hybrid analog/digital high pass filter is set at a low-frequency corner of the analog portion of the hybrid analog/digital high pass filter, wherein the pole is at a higher frequency than the zero.

15. The method of claim 13, wherein the high pass filtering and the digital filtering in the hybrid analog/digital high pass filter differentiates the analog servo field signal so that a perpendicular magnetic signal can be processed as a longitudinal magnetic signal.

16. The method of claim 13, further comprising detecting a phase error in an output of the digital portion of the hybrid analog/digital high pass filter and adjusting the pole-zero compensation based on the phase error.

17. The method of claim 16, wherein the phase error is detected based on a burst demodulation of the output of the digital portion of the hybrid analog/digital high pass filter.

18. The method of claim 13, wherein the sampling comprises oversampling, further comprising decimating an output of the digital portion of the hybrid analog/digital high pass filter.

19. A storage device, comprising:
a storage medium;
a head assembly disposed in relation to the storage medium;
an analog high pass filter connected to an analog input derived from the head assembly;
an analog to digital converter connected to an output of the analog high pass filter; and
a digital filter connected to an output of the analog to digital converter, wherein the analog high pass filter and the digital filter comprise a hybrid analog/digital high pass filter, and wherein the digital filter is configured to perform pole-zero compensation for the analog high pass filter.

20. The storage device of claim 19, wherein the analog input represents a perpendicular magnetic signal, and wherein the hybrid analog/digital high pass filter are operable to apply a mathematical differentiation to the analog input such that it can be processed as a longitudinal magnetic signal.

* * * * *